Patented Oct. 20, 1931

1,828,587

UNITED STATES PATENT OFFICE

JEAN BAER, OF BASEL, SWITZERLAND

MANUFACTURE OF FACTICE AND THE LIKE

No Drawing. Application filed June 10, 1929, Serial No. 369,940, and in Switzerland June 19, 1928.

In my pending U. S. patent application Ser. No. 221,399, filed September 22, 1927, I have described a process for the manufacture of an elastic caoutchouc like body which is characterized by the feature that sulphur or sulphur yielding substances are allowed to react upon saturated halogenized hydrocarbons of the group $C_nH_{2n+2}$ in the presence of a solvent, alkali- or earth-alkali-polysulphides in solution being preferably used as the sulphur yielding substances.

It has now been found that great advantages over the hitherto known factice can be obtained if for sulphuretting suitable oils instead of sulphur one of the above mentioned caoutchouc like bodies obtained from saturated halogenized hydro-carbons and polysulphides is used. In this way a more rapid transformation of the oils, in particular into factice which is soluble in hydro-carbons takes place.

The caoutchouc like bodies used in this process and which may contain about 84 per cent of sulphur behave like sulphur and convert at a temperature of about 170° C. all oils suitable for sulphuretting, whether they are of vegetable, animal or mineral nature, into factice or sulphuretted oil products which are all soluble in hydro-carbons.

*Example*

500 parts by weight of raw rape-seed oil are heated to 170° C. with 500 parts by weight of the caoutchouc like body obtained according to the above mentioned application, say from ethylene dichloride and calcium polysulphide, when in a short time a reaction takes place and the caoutchouc like body dissolves and is transformed into factice, which is soluble in benzene, chloroform, ethylene chloride and so forth. Instead of the polymerization products of ethylene dichloride and calcium polysulphide there may also be used those of methylene dichloride, ethylene dibromide, methylene dibromide, and other saturated halogenized hydro-carbons of the group $C_nH_{2n+2}$ and alkali metal or alkaline earth-metal polysulphides, such as potassium or sodium polysulphide.

What I claim is:—

1. A process for the manufacture of sulphuretted oils, in particular factice soluble in hydro-carbons, consisting in heating oils with a caoutchouc like body obtained from the reaction of a polysulphide with a saturated halogenized hydrocarbon of the group $C_nH_{2n+2}$.

2. A process for the manufacture of sulphuretted oils, in particular factice soluble in hydro-carbons, consisting in heating oils with a caoutchouc like body obtained from the reaction of ethylenedichloride and calcium polysulphide.

In witness whereof I have hereunto signed my name this 31st day of May, 1929.

JEAN BAER.